(12) United States Patent
Chi et al.

(10) Patent No.: US 11,624,736 B1
(45) Date of Patent: Apr. 11, 2023

(54) METHOD FOR IDENTIFYING WHETHER PORCINE HEPARIN IS ADULTERATED WITH HEPARIN FROM RUMINANTS

(71) Applicants: Shandong University, Shandong (CN); Shandong Institute for Food and Drug Control, Shandong (CN)

(72) Inventors: Lianli Chi, Shandong (CN); Deling Shi, Shandong (CN); Bin Zhang, Shandong (CN); Feng Shi, Shandong (CN); Mengmeng Li, Shandong (CN); Baojian Hang, Shandong (CN)

(73) Assignees: Shandong University, Shandong (CN); Shandong Institute for Food and Drug Control, Shandong (CN)

( * ) Notice: Subject to any disclaimer, the term of this patent is extended or adjusted under 35 U.S.C. 154(b) by 0 days.

(21) Appl. No.: 17/938,949

(22) Filed: Sep. 7, 2022

(51) Int. Cl.
G01N 30/72 (2006.01)
G01N 30/02 (2006.01)

(52) U.S. Cl.
CPC ... *G01N 30/7233* (2013.01); *G01N 2030/027* (2013.01)

(58) Field of Classification Search
CPC .............. G01N 30/7233; G01N 2030/027
See application file for complete search history.

(56) References Cited

FOREIGN PATENT DOCUMENTS

CN 111721872 A * 9/2020

* cited by examiner

*Primary Examiner* — Jennifer Wecker
*Assistant Examiner* — Michael Paul Shimek
(74) *Attorney, Agent, or Firm* — JCIPRNET

(57) ABSTRACT

The present application is related to a method for identifying whether porcine heparin is adulterated with heparin from ruminants, comprising: (1) respectively detecting the contents of trisaccharide(4S) and ΔUA2S-GlcNAc6S (ΔIA) in a sample and at least three batches of porcine heparin standards; (2) calculating a ratio of the trisaccharide(4S) to the ΔIA as well as a standard deviation (SD) of the ratio in the porcine heparin standards; when the ratio of the trisaccharide(4S) to the ΔIA in the sample exceeds a maximum value of the ratio in the porcine heparin standards+3SD, where the sample is considered to be mixed or adulterated with heparin from ruminants; wherein the detection method used is hydrophilic interaction liquid chromatography-mass spectrometry (HILIC-MS) or multiple reaction monitoring (MRM). The method can distinguish porcine heparin from ovine and bovine heparin based on the structural differences, regardless of the production process the heparin has undergone.

2 Claims, 10 Drawing Sheets

METHOD FOR IDENTIFYING WHETHER PORCINE HEPARIN IS ADULTERATED WITH HEPARIN FROM RUMINANTS

CROSS-REFERENCE TO RELATED APPLICATION

This application claims the priority benefit of China application serial no. 202111527994.9, filed on Dec. 15, 2021. The entirety of the above-mentioned patent application is hereby incorporated by reference herein and made a part of this specification.

BACKGROUND OF THE INVENTION

1. Technical Field

The present disclosure relates to the field of heparin identification, and in particular to a method for identifying whether porcine heparin is adulterated with heparin from ruminants (such as ovine or bovine heparin) in porcine heparin.

2. Background Art

Heparin is a heterogeneous linear polysaccharide with high negative charges in the glycosaminoglycan family, and mainly present in mammalian mast cells. Heparin consists of repeating disaccharide units formed by hexuronic acid (HexA) and D-glucosamine (GlcN) through 1→4 glycosidic linkage. 2-O-sulfate substitution may occur on the uronic acid residues; N-acetyl substitution, N-sulfate substitution, 6-O-sulfate substitution and 3-O-sulfate substitution may occur on the glucosamine residues. Heparin has been put into clinical application for the first time in 1935; heparin has been always used as a clinical anticoagulant, and widely applied for the prevention and treatment of thrombotic diseases. At present, the international market is highly demanding for active pharmaceutical ingredients of heparin and keeps a rapid growth trend.

Currently, the only one source of heparin approved by the FDA is porcine mucosa. Because ruminants, such as, cattle and sheep carry pathogenic prion proteins, possibly leading to a new Creutzfeldt-Jakob disease in humans, porcine heparin becomes a key requirement to ensure the safety of heparin. However, due to the single animal source of heparin, its population size, yield level and price are affected by the outbreak of diseases; and porcine heparin is susceptible to adulteration, contamination and mixing with heparin from other ruminants. Driven by interests, illegal businessmen adulterate bovine and ovine heparin into porcine heparin, which disturbs the order of heparin market, hinders the sound development of the heparin industry, and thus, brings serious hidden danger to consumers' health. At present, there is no highly-specific and sensitive method to identify heparin from different sources in the heparin market. It is necessary to develop an analysis method to effectively identify the source of heparin, thus controlling the product quality and production process.

Currently, methods for detecting the adulteration of heparin from ruminants include real-time polymerase chain reaction (qPCR), an immunological detection method, stable isotope analysis and chemometric analysis based on NMR data and mass spectrometry data. The animal origin of crude heparin can be determined by qPCR analysis of the residual nucleic acid fragments (e.g., mitochondrial genes, multi-copy nuclear genes, short fragment-interspersed nuclear repetitive elements, and the like). When the crude heparin sodium is refined into active pharmaceutical ingredients of heparin sodium by the steps of oxidation of potassium permanganate and hydrogen peroxide and the like for decoloration and nuclease treatment, the nucleic acid therein is further damaged, making the residual DNA difficult to be effectively detected. Meanwhile, researches have showed that since heparin polysaccharide has an inhibiting effect on enzyme amplification, leading to false negative easily. NMR can identify samples mixed with 25% bovine or ovine heparin by H-NMR combined with stoichiometric analysis, but it is expensive and requires professional operation.

SUMMARY OF THE INVENTION

To overcome the shortcomings of the prior art, the present disclosure develops a method for identifying whether porcine heparin is adulterated with heparin from ruminants. The method can distinguish porcine heparin from ovine and bovine heparin based on the structural differences, regardless of the production process the heparin has undergone.

To achieve the above objectives, the present disclosure adopts the following technical solutions:

a method for identifying porcine heparin is adulterated with heparin from ruminants, taking the following steps:

(1) respectively detecting the contents of trisaccharide (4S) with a structural formula of $\Delta$UA2S-GlcNS6S-HexA2S and $\Delta$UA2S-GlcNAc6S ($\Delta$IA) in the samples and at least three batches of porcine heparin standards;

(2) calculating a ratio of the trisaccharide(4S) content to the $\Delta$IA content as well as a standard deviation (SD) of the ratio in the porcine heparin standards; when the ratio of the trisaccharide(4S) content to the $\Delta$IA content in the sample exceeds a maximum value of the ratio in the porcine heparin standards+3 SD, the sample is considered to be mixed with heparin from ruminants.

Preferably, the contents of the trisaccharide(4S) and $\Delta$IA in the test sample in the step (1) are detected by hydrophilic interaction liquid chromatography-mass spectrometry (HILIC-MS) or multiple reaction monitoring (MRM).

Preferably, operating steps of the hydrophilic interaction liquid chromatography-mass spectrometry are as follows:

(1) performing exhaustive enzymatic digestion on the sample with a mixed heparinase I, II and III (each for 0.4 mIU/μL, mixed in equal volume);

(2) performing a relative quantitative analysis on trisaccharide(4S) and $\Delta$IA obtained in the step (1) by HILIC-MS, where an ion detection form of the trisaccharide(4S) is $[M-2H]^{2-}$ with a mass-to-charge ratio of 415.4729, and/or $[M-3H+Na]^{2-}$ with a mass-to-charge ratio of 426.4639; the detected ion form of $\Delta$IA is $[M-1-1]^-$ with a mass-to-charge ratio of 268.5 and/or $[M-3H+Na]^{2-}$ with a mass-to-charge ratio of 279.5.

(3) Chromatography and mass spectrometry conditions are as follows: analytical column: Phenomenex Luna 3 μm HILIC 200 Å (150×2.0 mm); mobile phase A: 5 mmol/L ammonium acetate aqueous solution; mobile phase B: 5 mmol/L ammonium acetate, and 98% acetonitrile solution; flow rate: 0.15 mL/min; injection volume: 20 μL; the step gradient: 0-5 min, 95% B; 5-6 min, 90% B; 6-25 min, 90-84% B; 25-27 min, 84-50% B; 27-31 min, 50-50% B; 31-32 min, 50-95% B; 32-40 min, 95-95% B. The mass spectrometry: Q Exactive plus; sheath gas: 40; Aux gas: 10; spray voltage: −3.8 kV; capillary temperature: 275° C.; S-lens: 50; m/z: 150-800; and acquisition time: 40 min.

Preferably, the MRM technical operation can be classified into a HILIC-MRM method or a C18-MRM method.

Preferably, the HILIC-MRM has the following operating steps:

① performing exhaustive enzymatic digestion on the sample with a mixed enzyme of heparinase I, heparinase II and heparinase III;

② performing a relative quantitative analysis on trisaccharide(4S) and ΔIA in the product of the step ① by MRM, for trisaccharide(4S), a parent ion mass-to-charge ratio is 415.5, z=−2, and a daughter ion mass-to-charge ratio is 156.7, z=1; for ΔIA, a parent ion mass-to-charge ratio is 268.5, z=−2, and a daughter ion mass-to-charge ratio is 300.0, z=1;

③ chromatography and mass spectrometry conditions are as follows: analytical column: Phenomenex Luna 3 μm HILIC 200 Å (150×2.0 mm); mobile phase A: 5 mmol/L ammonium acetate aqueous solution; mobile phase B: 5 mmol/L ammonium acetate, and 98% acetonitrile solution; flow rate: 0.15 mL/min; injection volume: 10 μL; the step gradient: 0-5 min, 95% B; 5-12 min, 95-50% B; 12-15 min, 50% B; 15-20 min, 95% B; mass spectrometry conditions: spray voltage: −3.7 kV; spray gas flow rate: 30 arb; acquisition time: 15 min; HILIC-MRM channel parameters:

| # | Component | Structure | Theoretical molecular weight | Parent ion | Daughter ion |
|---|---|---|---|---|---|
| 1 | ΔIA | ΔUA2S-G1cNAc6S | 539.0251 | m/z = 268.5, z = −2 | m/z = 300.0, z = −1 |
| 2 | Trisaccharide (4S) | ΔUA2S-GlcNS6S-HexA2S | 832.9602 | m/z = 415.5, z = −2 | m/z = 157.0, z = −1 |

Preferably, the C18-MRM method has the following operating steps:

① performing exhaustive enzymatic digestion on the sample with a mixed enzyme of heparinase I, heparinase II and heparinase III;

② labelling the sample obtained after the full enzymolysis in the step ① with a 2-aminoacridone solution (AMAC), reducing the same with sodium cyanoborohydride, centrifuging to take supernatant and preserving the same at −20° C. for further use;

③ performing a relative quantitative analysis on trisaccharide(4S) and ΔIA in the full enzymatic hydrolysate labelled by the AMAC in the step ② with MRM, where in the quantitative method derived from the trisaccharide(4S) AMAC, a parent ion mass-to-charge ratio is 512.5, z=−2; and a daughter ion mass-to-charge ratio is 432.5, z=−1; and in the quantitative method derived from the ΔIA AMAC, a mass-to-charge ratio is chosen to 732.1, z=−2, and a daughter ion mass-to-charge ratio is 652.3, z=−1;

④ chromatographic conditions of the C18-MRM method are as follows: analytical column: Kinetex 2.6 μm EVO C18 100 Å (150×2.1 mm); mobile phase A: 50 mmol/L ammonium acetate aqueous solution; mobile phase B: methanol; flow rate: 0.3 mL/min; injection volume: 1 μL; column temperature: 45° C.; the step gradient: 0-2 min, 5% B; 2-4 min, 26% B; 4-8 min, 40% B; 8-10 min, 100% B; 10-15 min, 5% B; mass spectrometry conditions: spray voltage: −3.7 kV; spray gas flow rate: 30 arb; acquisition time: 15 min;

mass spectrometry conditions of the C18-MRM method are as follows: spray voltage: −3.7 kV; spray gas flow rate: 30 arb; acquisition time: 15 min; C18-MRM channel parameters:

| # | Component | Structure | Theoretical molecular weight | Parent ion | Daughter ion |
|---|---|---|---|---|---|
| 1 | ΔIA-AMAC | ΔUA2S-G1cNAc6S-AMAC | 733.1095 | m/z = 732.1022, z = −1 | m/z = 652.1454, z = −1 |
| 2 | Trisaccharide (4S) | ΔUA2S-GlcNS6S-HexA2S-AMAC | 1027.0446 | m/z = 512.5150, z = −2 | m/z = 432.5366, z = −1 |

Further, the labelling method of the 2-aminoacridone solution (AMAC) in the step ② is as follows: (1) a certain amount of 2-aminoacridone (AMAC) is added into the mixed solution of dimethyl sulfoxide and glacial acetic acid (a volume ratio of dimethyl sulfoxide to glacial acetic acid is 17:3) to a final concentration of 0.1 moL/L; (2) adding 5 μL 0.1 moL/L AMAC to the full-enzymolysis sample which has been completely dried, react at room temperature for 15 min, then adding 5 μL 1 moL/L NaBH$_3$CN aqueous solution to react at 45° C. for 1 h.A; after the reaction, performing high-speed centrifugation for 3 min, and taking 9 μL supernatant to a sample bottle.

Any one or both of the two detection methods of HILIC-MS and MRM can be selected according to the detection requirements. Both methods can be used to obtain the contents of trisaccharide(4S) and ΔIA. The difference of the two methods lies in the used instrument, analytical column and detection method.

The present disclosure has the following beneficial effects:

1. Compared with the qPCR method, the method in the present disclosure is established based on the differences in the structures of porcine, bovine and ovine heparin chains. Different from the indirect identification methods of the PCR based on DNA residues or of immunological detection methods based on protein residues, the difference in the ratio of trisaccharide(4S) to ΔIA in the present disclosure cannot be removed by separation and purification, thereby avoiding the possibility of artificial damage and making the results more reliable.

2. Compared with the existing method of NMR, the detection method of mass spectrometry herein has less quantity demanded for sample detection, short detection time, simple data analysis method and high detection sensitivity.

3. The present disclosure provides two sets of sample detection methods; the currently common high resolution mass spectrometry and triple quadrupole mass spectrometry are used such that the analysis method can be widely applied in scientific research institutions, enterprises, detection institutions, and the like.

4. The detection method is specific and can be applied to the identification of crude heparin and refined products. Therefore, the detection method has a good market application value.

BRIEF DESCRIPTION OF THE DRAWINGS

FIG. 4 shows the ratios (analysed by HILIC-MS) of trisaccharide(4S) to ΔIA of the porcine heparin standards mixed with different proportions of ovine heparin after the full enzymolysis, where Ovine_mix indicates that six batches of ovine heparin were mixed in equal proportions, and Porcine_mix indicates that six batches of porcine heparin standards were mixed in equal proportions; 1% represents that 1% ovine heparin is mixed in the porcine heparin standards, and so on.

DETAILED DESCRIPTION OF THE EMBODIMENTS

Figure 1:
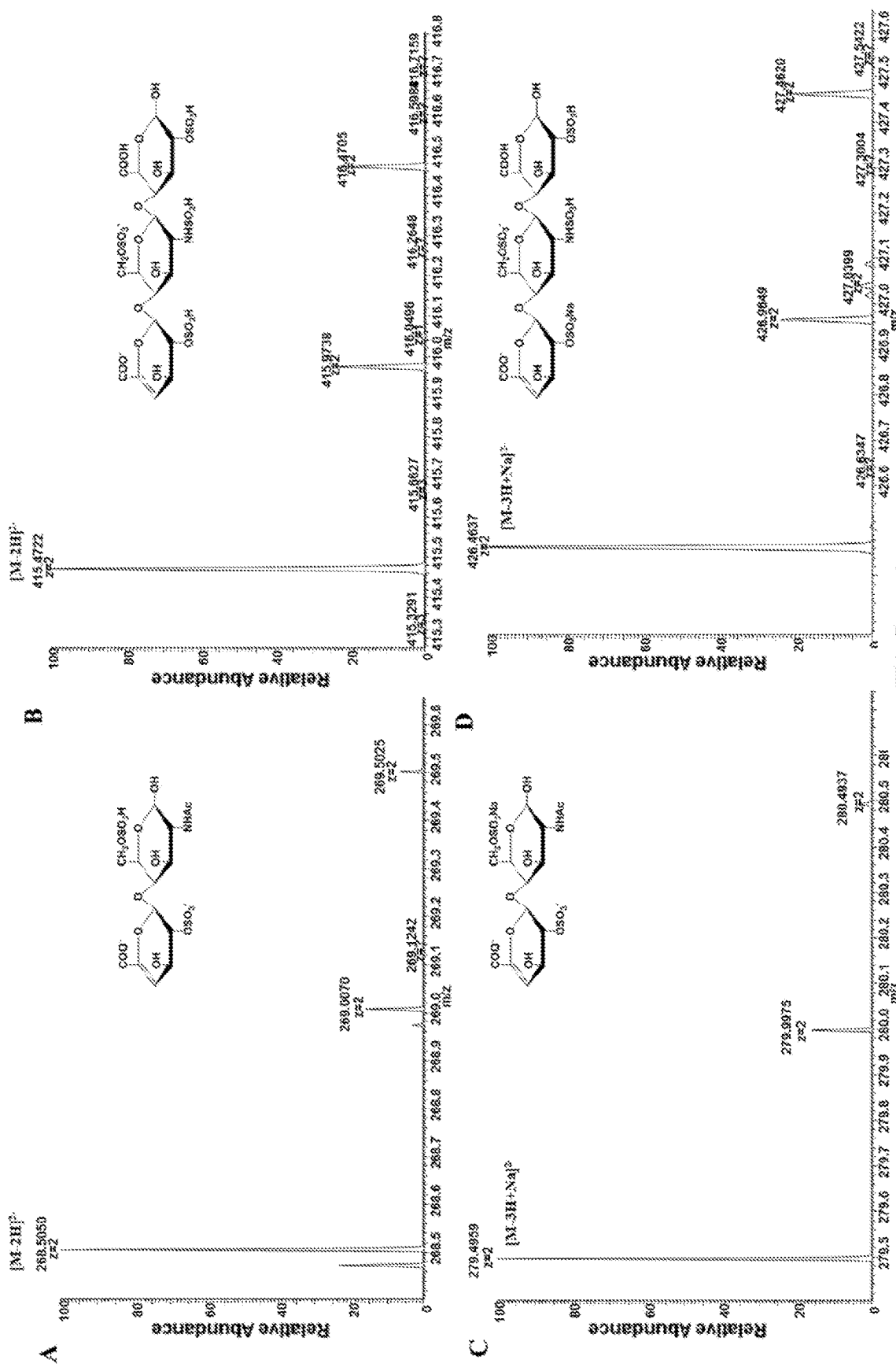
FIG. 1 is high-resolution mass spectra of (A) ΔIA ([M−2H]$^{2-}$); (B) trisaccharide(4S) ([M−2H]$^{2-}$); (C) ΔIA ([M−3H+Na]$^{2-}$) and (D) trisaccharide(4S) ([M−3H+Na]$^{2-}$) by HILIC-MS analysis.

In the following description, specific details of the present disclosure are further set forth to provide a thorough understanding of the present disclosure. Terms used in the description of the present disclosure herein are for the purpose of describing advantages and features of the present disclosure only but not construed as limiting the present disclosure.

Unless defined otherwise, all technical and scientific terms used herein have the same meaning as commonly understood by those skilled in the art to which this present disclosure belongs. Unless otherwise specified, all the drugs or reagents used herein are used according to the product manual or conventional methods in the art. The technical solutions of the present disclosure will now be further described with reference to the accompanying drawings and detailed embodiments.

Example 1

Instruments and equipment, chemical reagents and experimental procedures used in the present disclosure are specifically as follows:

1. Instruments (1) High performance liquid chromatography-mass spectrometer (2) High resolution mass spectrometer (3) Triple quadrupole mass spectrometer 2. Reagents

| Reagents | Specification |
|---|---|
| Heparinases I, II, and III | Commercially available heparinases, such as Asnail and BIOKANGTAI |
| Ammonium acetate | Guaranteed Reagent (GR)/Ultra Pure |
| Acetonitrile, H$_2$O | Analytical Reagent (AR)/chromatographically pure (LC) |
| AMAC | Analytical Reagent (AR)/chromatographically pure (LC) |
| DMSO | Analytical Reagent (AR)/chromatographically pure (LC) |
| Acetic acid | Analytical Reagent (AR)/chromatographically pure (LC) |
| NaBH$_3$CN | Analytical Reagent (AR)/chromatographically pure (LC) |

3. Experimental Operation 3.1 Detection Method of Hydrophilic Interaction Liquid Chromatography-Mass Spectrometry (HILIC-MS)

3.1.1 Processing Steps for Heparin Samples

Exhaustive enzymatic digestion: porcine heparin standards and samples were dissolved with water to 20 μg/μL, respectively, each 2.5 μL was taken and added with 8.75 μL sodium acetate/calcium acetate buffer solution (10 mg bovine serum albumin and 32 mg calcium acetate were dissolved into 60 mL water, 580 μL glacial acetic acid was added and mixed well, then pH was regulated to 7.0 with 2 mol/L sodium hydroxide solution, metered to a volume of 100 mL with water) and 12.5 μL mixed solution of heparinases I, II and III (heparinase I, heparinase II and heparinase III were all 0.4 mIU/μL, dissolved by the sodium acetate/calcium acetate buffer solution). The above mixture was incubated for 36 h at 25° C., then 12.5 μL mixed solution of heparinases I, II and III was added to continue the incubation. After the total incubation time reached 72 h, the above product was heated in a water bath at 100° C. for 10 min to inactivate the heparinases, then centrifuged at 12000 r/min for 10 min, and the supernatant was taken and lyophilized.

3.1.2 The Detection Conditions of HILIC-MS are as Follows:

Prior to the analysis by HILIC-MS, 20 μg sample was dissolved in 80% mobile phase B.

Analytical column: Phenomenex Luna 3 μm HILIC 200 Å (150×2.0 mm); mobile phase A: 5 mmol/L ammonium acetate aqueous solution; mobile phase B: 5 mmol/L ammonium acetate, and 98% acetonitrile solution; flow rate: 0.15 mL/min; injection volume: 20 μL; the step gradient: 0-5 min, 95% B; 5-6 min, 90% B; 6-25 min, 90-84% B; 25-27 min, 84-50% B; 27-31 min, 50-50% B; 31-32 min, 50-95% B; 32-40 min, 95-95% B.

Parameters of mass spectrometry: instrument: Q Exactive plus; sheath gas: 40; Aux gas: 10; spray voltage: 3.8 kV; capillary tmp: 275° C.; S-lens: 50; m/z: 150-800; and acquisition time: 40 min.

3.2 Multiple Reaction Monitoring (MRM) Detection Method 3.2.1 Processing Steps for Heparin Samples The MRM technical operation may be classified into a HILIC-MRM method or a C18-MRM method.

HILIC-MRM sample processing: exhaustive enzymatic digestion: samples and porcine heparin standards were dissolved with water to 20 μg/μL, respectively, each 2.5 μL was taken and added with 8.75 μL sodium acetate/calcium acetate buffer solution (10 mg bovine serum albumin and 32 mg calcium acetate were dissolved into 60 mL water, 580 μL glacial acetic acid was added and mixed well, then pH was regulated to 7.0 with 2 mol/L sodium hydroxide solution, metered to a volume of 100 mL with water) and 12.5 μL mixed solution of heparinases I, II and III (heparinase I, heparinase II and heparinase III were all 0.4 mIU/μL, dissolved by the sodium acetate/calcium acetate buffer solution). The above mixture was incubated for 36 h at 25° C., then 12.5 μL mixed solution of heparinases I, II and III was added to continue the incubation. After the total incubation time reached 72 h, the above product was heated in a water bath at 100° C. for 10 min to inactivate the heparinases, then centrifuged at 12000 r/min for 10 min, and the supernatant was taken and lyophilized.

C18-MRM sample processing: the sample was labelled by AMAC after being subjected to enzymolysis and lyophilization. A certain amount of 2-aminoacridone (AMAC) was weighed and dissolved into the mixed solution of dimethyl sulfoxide and glacial acetic acid (a volume ratio of dimethyl sulfoxide to glacial acetic acid was 17:3) to a final concentration of 0.1 moL/L; 5 μL 0.1 moL/L AMAC was added to the full-enzymolysis sample which had been completely dried for reaction for 15 min at room temperature, and 5 μL 1 moL/L NaBH$_3$CN aqueous solution was added for 1 h at 45° C. After the reaction, 9 μL supernatant was taken after high-speed centrifugation for 3 min, and placed to a sample bottle.

3.2.2 The Detection Conditions of the MRM:

(1) HILIC-MRM Detection Conditions:

Prior to the analysis by HILIC-MRM, 5 μg sample was dissolved in 80% mobile phase B.

Analytical column: Phenomenex Luna 3 μm HILIC 200 Å (150×2.0 mm); mobile phase A: 5 mmol/L ammonium acetate aqueous solution; mobile phase B: 5 mmol/L ammonium acetate, and 98% acetonitrile solution; flow rate: 0.15 mL/min; injection volume: 10 μL; 0-5 min, 95% B; 5-12 min, 95-50% B; 12-15 min, 50% B; 15-20 min, 95% B.

Mass spectrometry conditions: spray voltage: −3.7 kV; spray gas flow rate: 30 arb; acquisition time: 15 min.

TABLE 1 shows the HILIC-MRM channel parameters:

| # | Name | Structure | Theoretical molecular weight | Parent ion | Daughter ion |
|---|------|-----------|------------------------------|------------|--------------|
| 1 | ΔIA | ΔUA2S-GlcNAc6S | 539.0251 | m/z = 268.5, z = −2 | m/z = 300, z = −1 |
| 2 | Trisaccharide (4S) | ΔUA2S-GlcNS6S-HexA2S | 832.9602 | m/z = 415.5, z = −2 | m/z = 157.0, z = −1 |

(2) C18-MRM

The amount of sample to be analyzed is 5 μg.

Analytical column: Kinetex 2.6 μm EVO C18 100 Å (150×2.1 mm); mobile phase A: 50 mmol/L ammonium acetate aqueous solution; mobile phase B: methanol solution; flow rate: 0.3 mL/min; injection volume: 1 μL; column temperature: 45° C.; the step gradient: 0-2 min, 5% B; 2-4 min, 26% B; 4-8 min, 40% B; 8-10 min, 100% B; 10-15 min, 5% B;

mass spectrometry conditions: spray voltage: −3.7 kV; spray gas flow rate: 30 arb; acquisition time: 15 min.

TABLE 2 shows the C18-MRM channel parameters:

| # | Name | Structure | Theoretical molecular weight | Parent ion | Daughter ion |
|---|------|-----------|------------------------------|------------|--------------|
| 1 | ΔIA-AMAC | ΔUA2S-GlcNAc6S-AMAC | 733.1095 | m/z = 732.1022, z = −1 | m/z = 652.1454, z = −1 |
| 2 | Trisaccharide (4S) | ΔUA2S-GlcNS6S-HexA2S-AMAC | 1027.0446 | m/z = 512.5150, z = −2 | m/z = 432.5366, z = −1 |

4. Verification Test

The six batches of porcine heparin standards, six batches of ovine heparin and six batches of bovine heparin were subjected to relative quantification and ratio analysis of trisaccharide(4S) and ΔIA by the method of the present disclosure, respectively.

(I) Detection Results and Analysis of HILIC-MS

Figure 2:
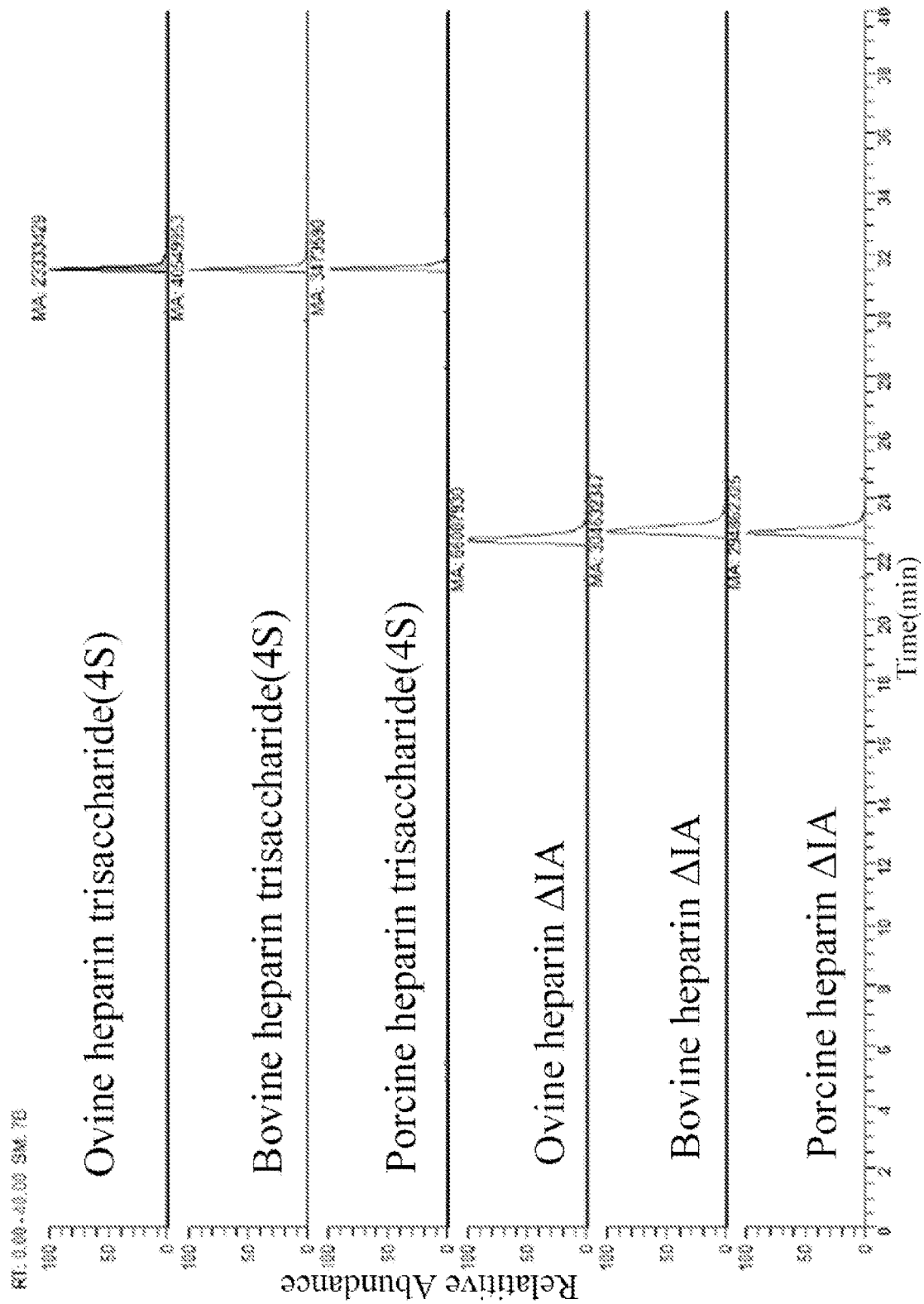
FIG. 2 is extracted ion chromatogram (EIC) of trisaccharide(4S) and ΔIA in ovine, bovine and porcine heparin by HILIC-MS analysis.

FIG. 1 is high resolution mass spectrums and structure diagrams of trisaccharide(4S) ([M−2H]$^{2-}$) and [M−3H+Na]$^{2-}$) and ΔIA ([M−2H]$^{2-}$ and [M−3H+Na]$^{2-}$) analysed by HILIC-MS described in the present disclosure. The extracted ion chromatograms (EIC) are shown in FIG. 2. The content of trisaccharide(4S) in porcine heparin standards is significantly lower than that in bovine and ovine heparin.

Figure 3:
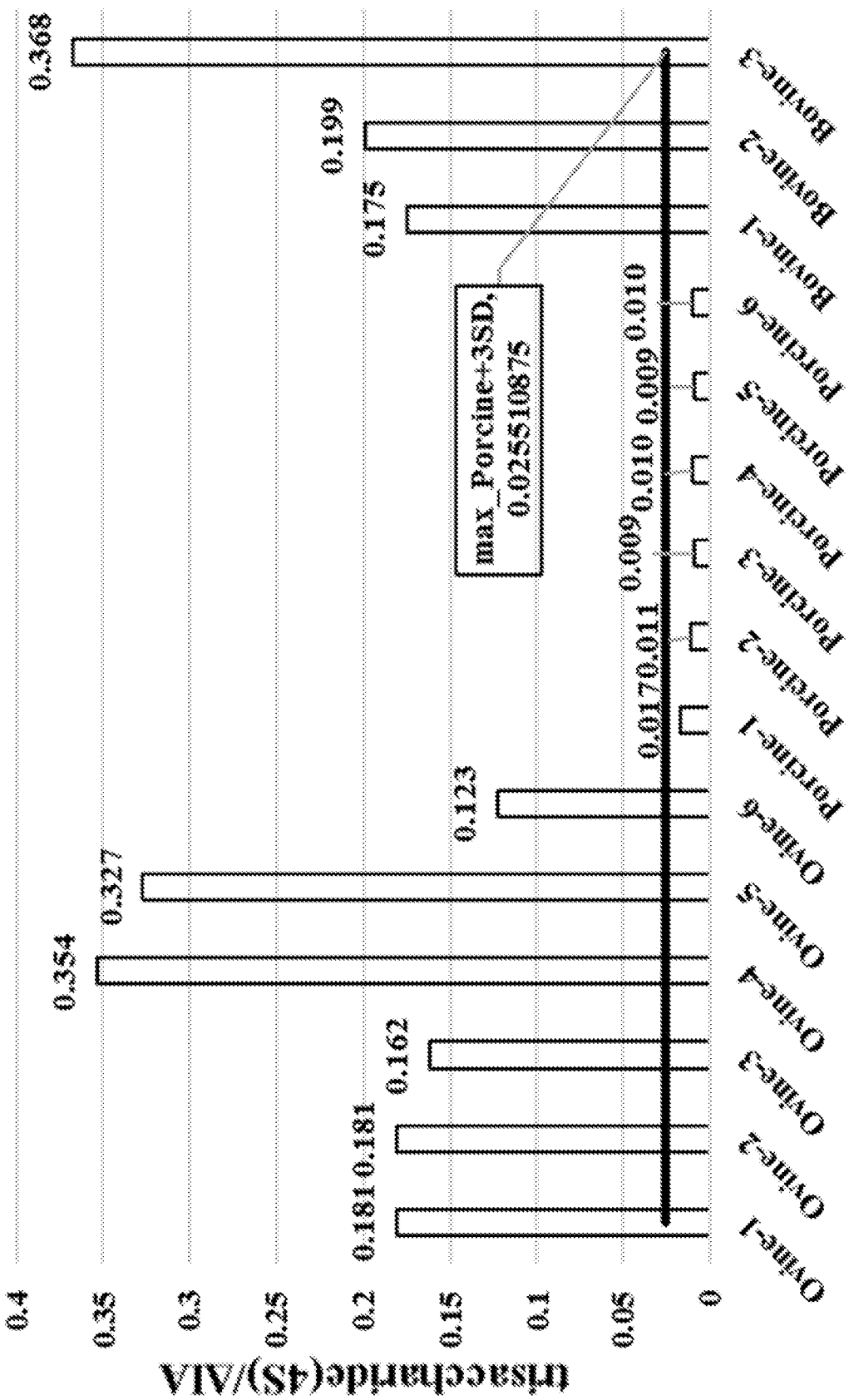
FIG. 3 shows HILIC-MS results, ratios of trisaccharide (4S) contents to ΔIA contents of ovine, porcine and bovine heparin, where the black horizontal line max_Porcine+3 SD represents the maximum value of trisaccharide(4S)/ΔIA from the six batches of porcine heparin standards plus 3SD.

The ratios of trisaccharide(4S) to ΔIA in six batches of porcine heparin standards, six batches of ovine heparin and 3 batches of bovine heparin obtained by the HILIC-MS are shown in FIG. 3. The ratio of trisaccharide(4S) to ΔIA is much lower in porcine heparin than in ovine and bovine heparin. Therefore, the ratio is used to distinguish porcine heparin from bovine and ovine heparin. When the maximum ratio of trisaccharide(4S) to ΔIA in porcine heparin standards+3SD serves as the determination condition (the black horizontal line max_Porcine+3SD in FIG. 3), the ratios of bovine and ovine heparin obviously exceed the standard, such that the sample is determined to be ruminant-derived heparin or to contain ruminant-derived heparin.

Figure 4:
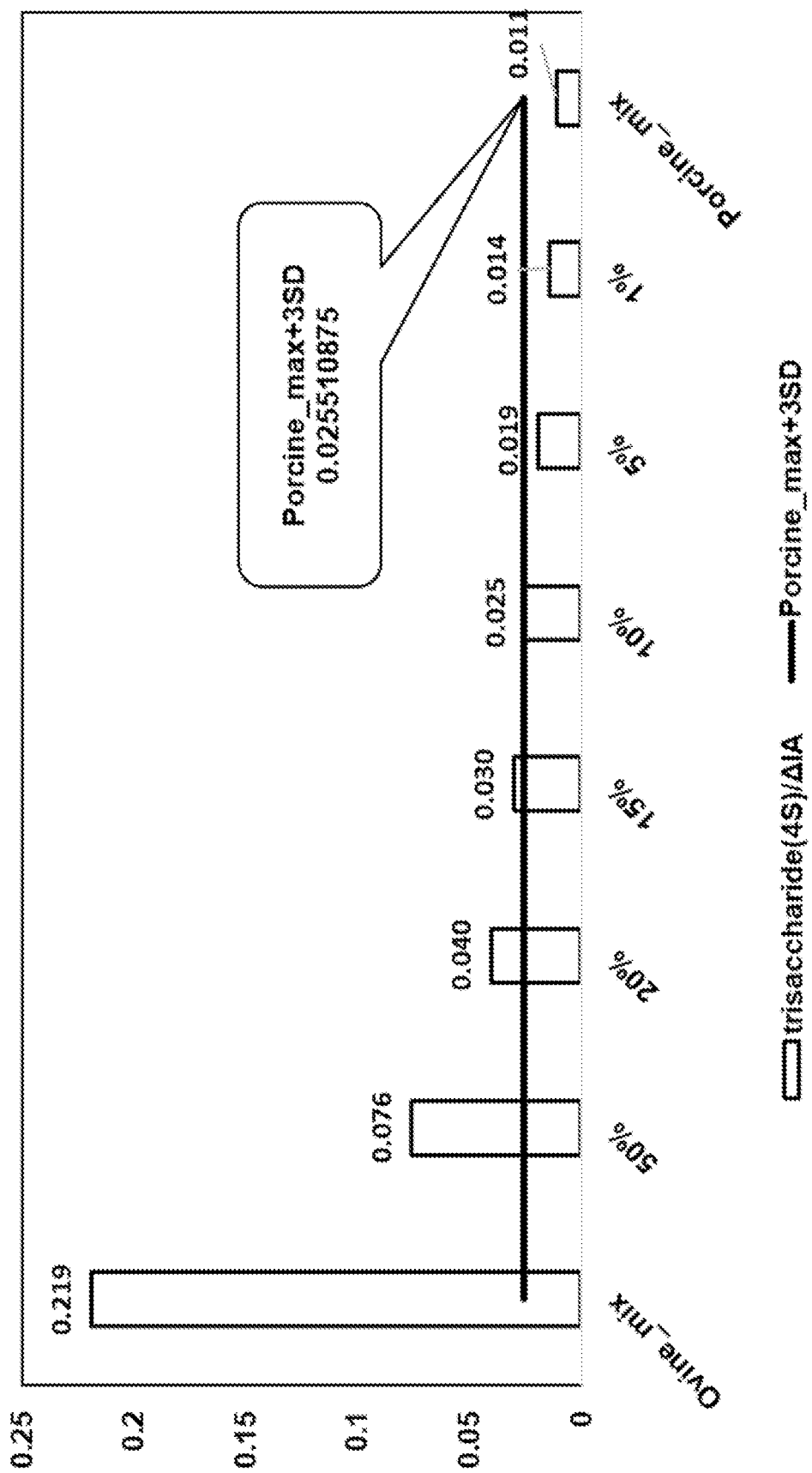

Furthermore, porcine heparin standards were mixed with different proportions of ovine heparin; and the ratios of trisaccharide(4S) to ΔIA were analysed by HILIC-MS (see FIG. 4). In FIG. 4, Ovine_mix represents six batches of ovine heparin that are mixed in equal proportion, and Porcine_mix represents six batches of porcine heparin standards that are mixed in equal proportion; 50% represents that 50% mixed ovine heparin is mixed in the mixed porcine heparin standards, and so on; the maximum ratio of trisaccharide(4S) to ΔIA in the six batches of porcine heparin standards+3SD serves as the determination condition (the black horizontal line max_Porcine+3SD in FIG. 4); when more than 15% ovine heparin is mixed in porcine heparin, porcine heparin may be judged to be mixed with ovine heparin.

(II) Detection Results of the MRM Method (1) HILIC-MRM Detection Results

Figure 5:
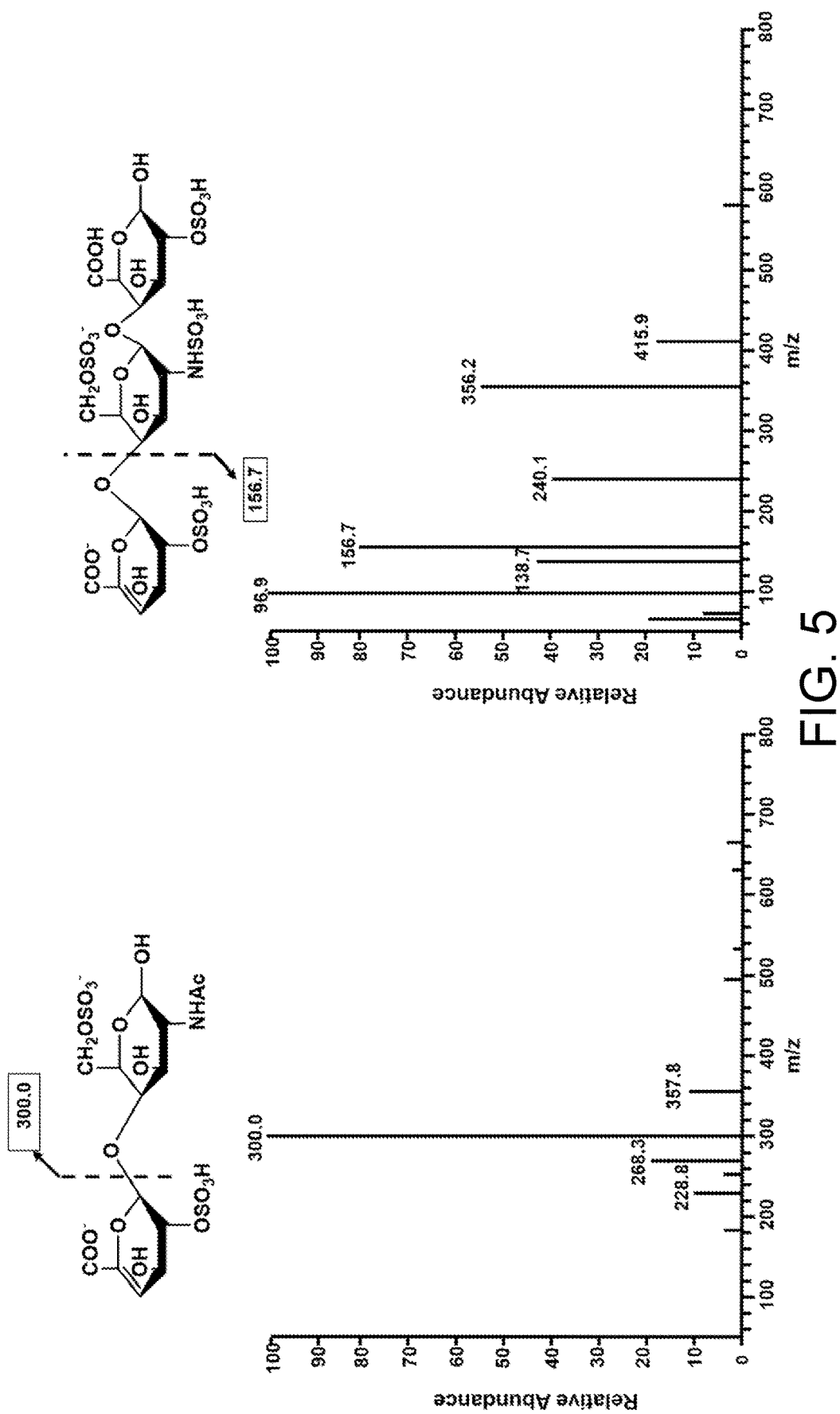
FIG. 5 is a tandem mass spectra of ΔIA and trisaccharide (4S), where, fragment ions (m/z=300.0, z=−1) of ΔIA and fragment ions (m/z=156.7, z=−1) of trisaccharide(4S) are used for the establishment of the HILIC-MRM method.
Figure 6:
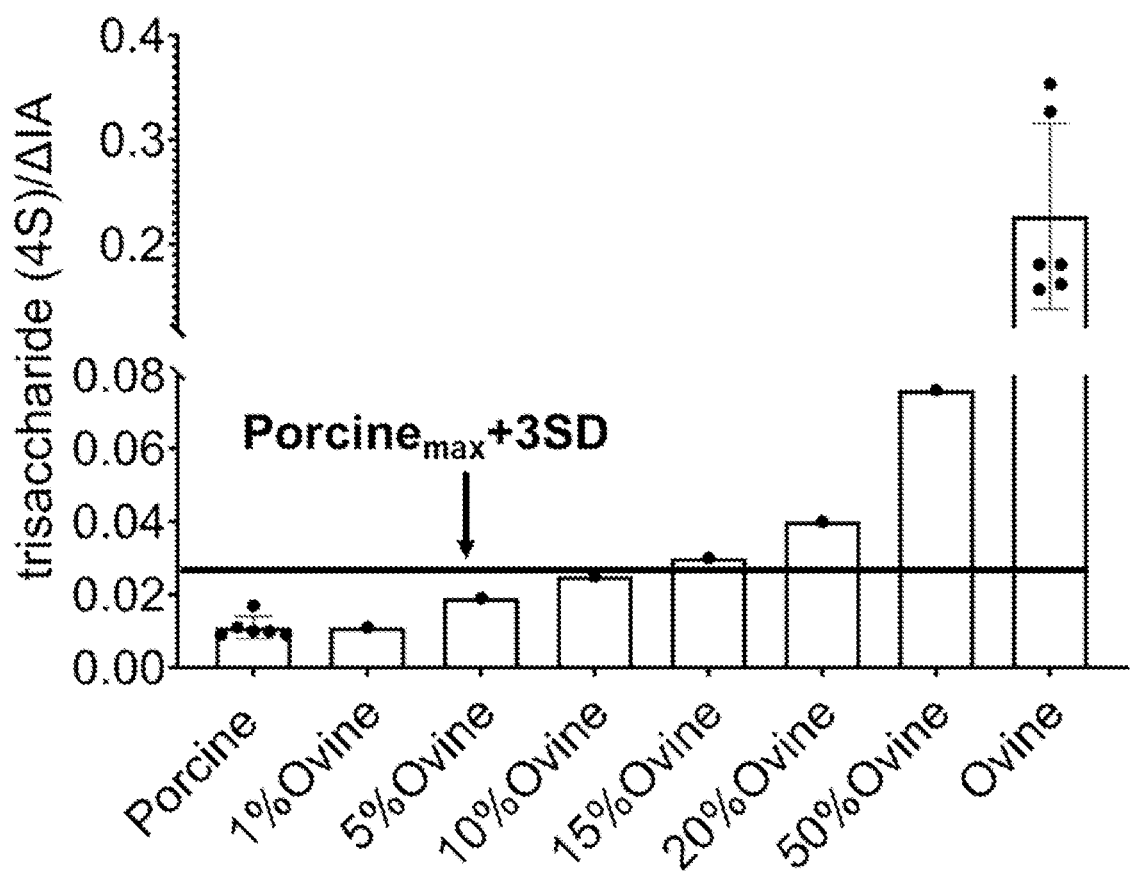
FIG. 6 shows the ratios of trisaccharide(4S) to ΔIA of the porcine heparin standards mixed with different proportions of ovine heparin analysed by HILIC-MRM, where Ovine indicates that six batches of ovine heparin were mixed in equal proportions, and Porcine indicates that six batches of porcine heparin standards were mixed in equal proportions; 1% Ovine represents that 1% ovine heparin is mixed in the porcine heparin standards, and so on; Porcine$_{max}$+3SD represents that the maximum ratio of trisaccharide(4S) to ΔIA in the six bathes of porcine plus 3 times the standard deviation.

HILIC-MRM method was used to quantitatively analyse the contents of trisaccharide(4S) and ΔIA. FIG. 5 is a tandem mass spectra of ΔIA and trisaccharide(4S), where, fragment ions (m/z=300.0, z=−1) of ΔIA and fragment ions (m/z=156.7, z=−1) of trisaccharide(4S) are used for the establishment of the HILIC-MRM method;

FIG. 6 shows the ratios of trisaccharide(4S) to ΔIA of the porcine heparin standards mixed with different proportions of ovine heparin analysed by HILIC-MRM, where Ovine indicates that six batches of ovine heparin were mixed in equal proportions, and Porcine indicates that six batches of porcine heparin standards were mixed in equal proportions; 1% Ovine represents that 1% ovine heparin is mixed in the porcine heparin standards, and so on; Porcine$_{max}$+3SD represents that the maximum ratio of trisaccharide(4S) to ΔIA in the six bathes of porcine plus 3 times the standard deviation. The maximum ratio of trisaccharide(4S) to ΔIA in the six batches of porcine heparin standards+3SD serves as the determination condition (black horizontal line Porcine$_{max}$+3SD in FIG. 6), when more than 15% ovine heparin is mixed in porcine heparin, the ratios of trisaccharide(4S) to ΔIA obviously exceed the standard, such that the sample may be determined as heparin from ruminants or to contain heparin from ruminants.

Figure 7:
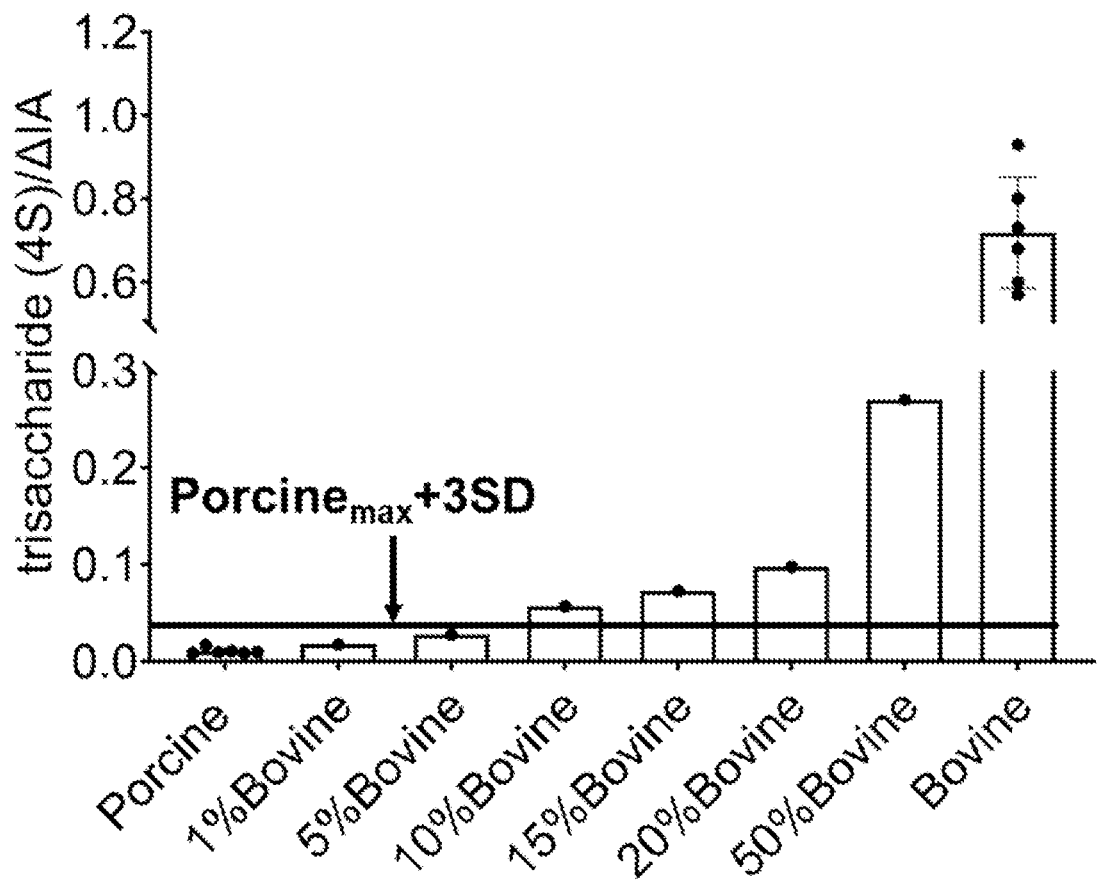
FIG. 7 shows the ratios of trisaccharide(4S) to ΔIA of the porcine heparin standards mixed with different proportions of bovine heparin analysed by HILIC-MRM, where Bovine indicates that six batches of bovine heparin were mixed in equal proportions, and Porcine indicates that six batches of porcine heparin standards were mixed in equal proportions; 1% bovine represents that 1% bovine heparin is mixed in the porcine heparin standards, and so on; Porcine$_{max}$+3SD represents that the maximum ratio of trisaccharide(4S) to ΔIA in the six bathes of porcine plus 3 times the standard deviation.

FIG. 7 shows the ratios of trisaccharide(4S) to ΔIA of the porcine heparin standards mixed with different proportions of bovine heparin analysed by HILIC-MRM, where Bovine indicates that six batches of bovine heparin were mixed in equal proportions, and Porcine indicates that six batches of porcine heparin standards were mixed in equal proportions; 1% Bovine represents that 1% bovine heparin is mixed in the porcine heparin standards, and so on; Porcine$_{max}$+3SD represents that the maximum ratio of trisaccharide(4S) to ΔIA in the six bathes of porcine plus 3 times the standard deviation. The maximum ratio of trisaccharide(4S) to ΔIA in the six batches of porcine heparin standards+3SD serves as the determination condition (black horizontal line Porcine$_{max}$+3SD in FIG. 7), when more than 10% bovine heparin is mixed in porcine heparin, the ratios of trisaccharide(4S) to ΔIA obviously exceed the standard, such that the sample may be determined as heparin from ruminants or to contain heparin from ruminants.

(2) C18-MRM Detection Results

Figure 8:
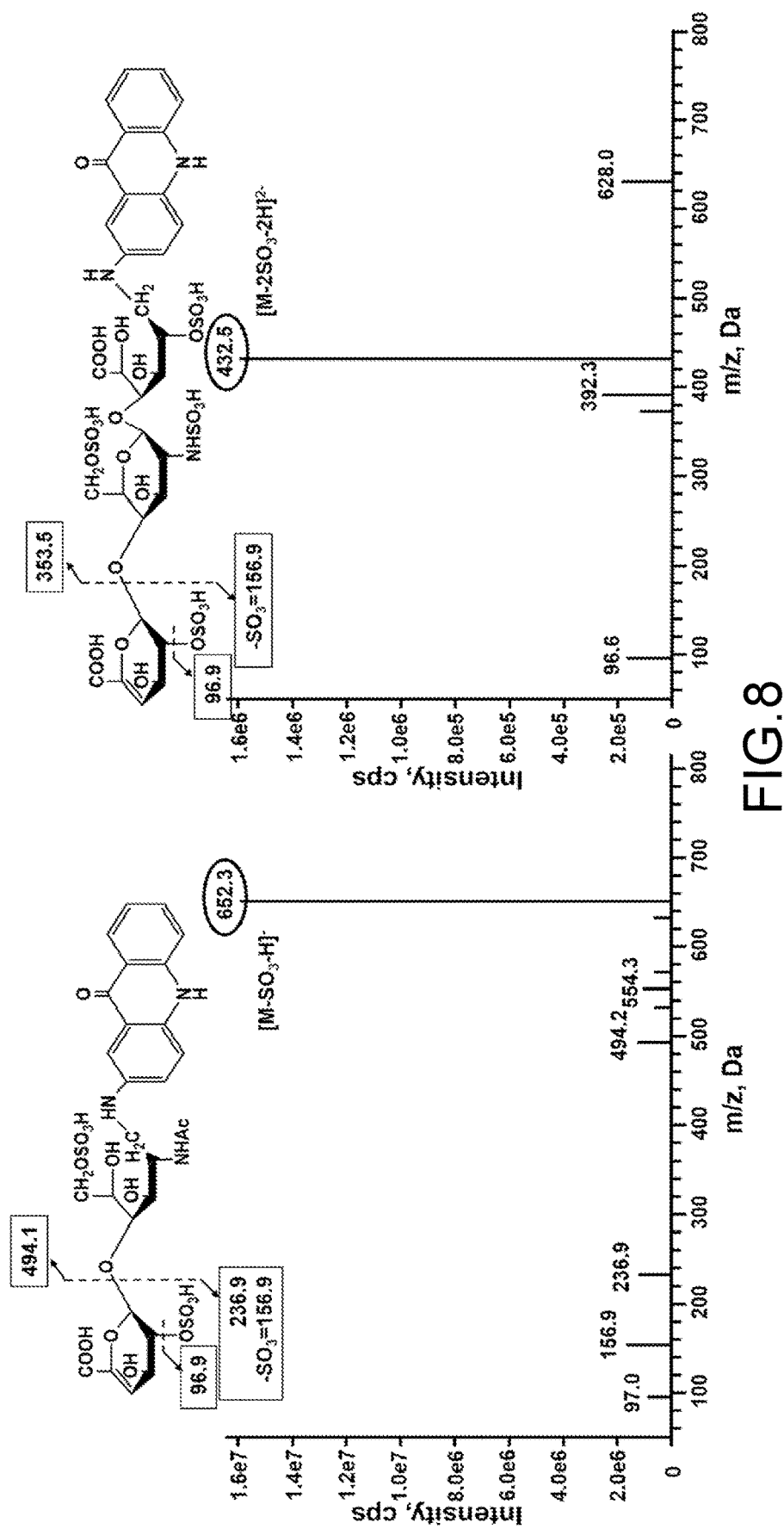
FIG. 8 is a tandem mass spectra of ΔIA and trisaccharide (4S) after being labelled by AMAC, where, parent ions (m/z=652.3, z=−1) of ΔIA-AMAC and parent ions (m/z=432.5, z=−1) of trisaccharide(4S)-AMAC are used for the establishment of the C18-MRM method.

C18-MRM method was used to quantitatively analyse the contents of trisaccharide(4S) and ΔIA as well as their ratios. FIG. 8 shows is a tandem mass spectra of ΔIA and trisaccharide(4S) after being labelled by AMAC, where, fragment ions (m/z=652.3, z=−1) of ΔIA-AMAC and fragment ions (m/z=432.5, z=−1) of trisaccharide(4S)-AMAC are used for the establishment of the AMAC method; and the contents of trisaccharide(4S) and ΔIA and their ratio may be obtained.

Figure 9:
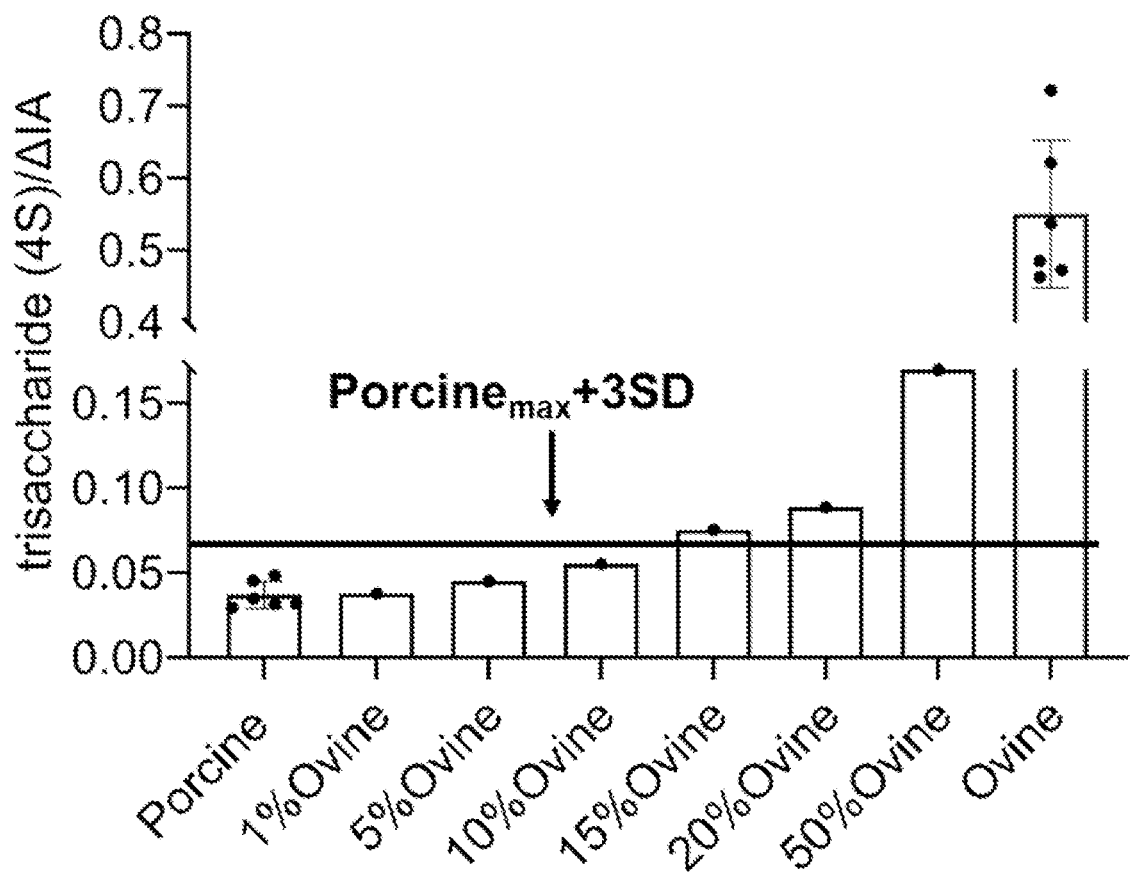
FIG. 9 shows the ratios of trisaccharide(4S) to ΔIA of the porcine heparin standards mixed with different proportions of ovine heparin analysed by C18-MRM, where Ovine indicates that six batches of ovine heparin were mixed in equal proportions, and Porcine indicates that six batches of porcine heparin standards were mixed in equal proportions; 1% Ovinere presents that 1% ovine heparin is mixed in the porcine heparin standards, and so on; Porcine$_{max}$+3SD represents that the maximum ratio of trisaccharide(4S) to ΔIA in the six bathes of porcine plus 3 times the standard deviation.

FIG. 9 shows the ratios of trisaccharide(4S) to ΔIA of the porcine heparin standards mixed with different proportions of ovine heparin analysed by C18-MRM, where Ovine indicates that six batches of ovine heparin were mixed in equal proportions, and Porcine indicates that six batches of porcine heparin standards were mixed in equal proportions; 1% Ovine represents that 1% ovine heparin is mixed in the porcine heparin standards, and so on; Porcine$_{max}$+3SD represents that the maximum ratio of trisaccharide(4S) to ΔIA in the six bathes of porcine plus 3 times the standard deviation. The maximum ratio of trisaccharide(4S) to ΔIA in the six batches of porcine heparin standards+3SD serves as the determination condition (black horizontal line Porcine$_{max}$+3SD in FIG. 9), when more than 15% ovine heparin is mixed in porcine heparin, the ratios of trisaccharide(4S) to ΔIA obviously exceed the standard, such that the sample may be determined as heparin from ruminants or to contain heparin from ruminants.

Figure 10:
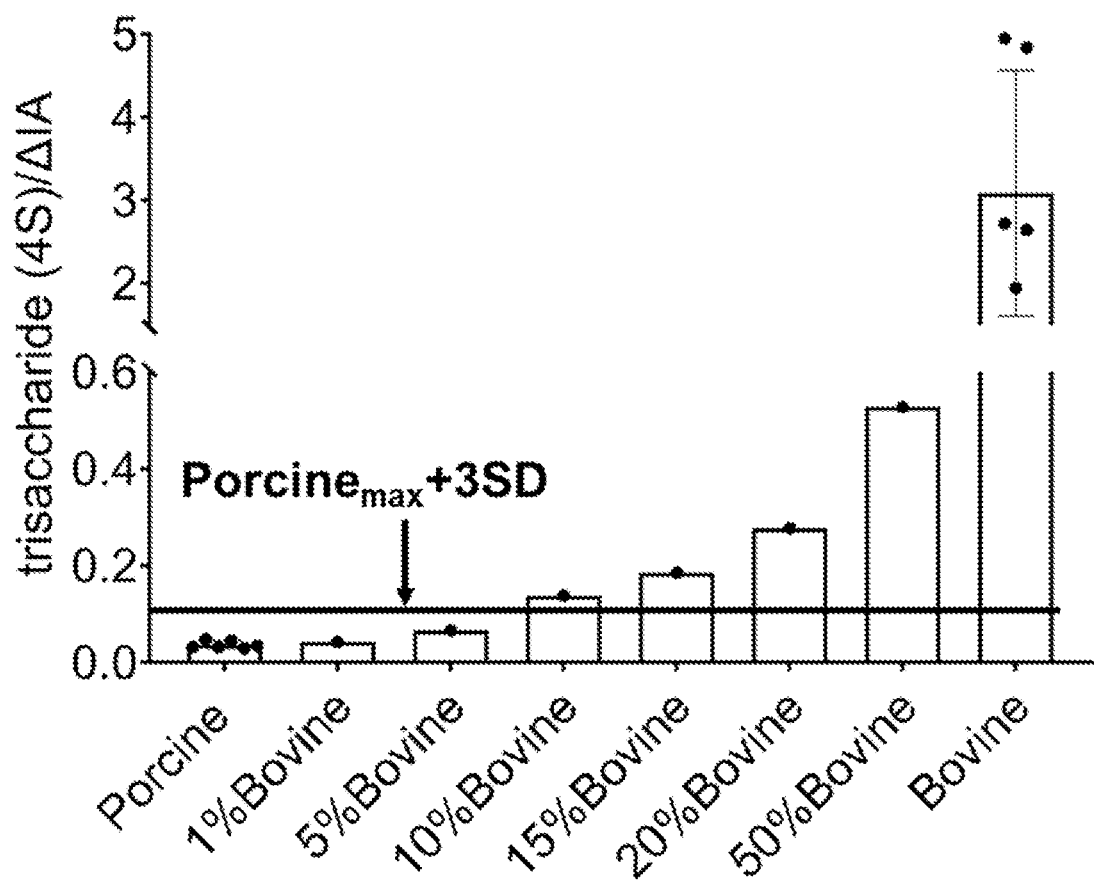
FIG. 10 shows the ratios of trisaccharide(4S) to ΔIA of the porcine heparin standards mixed with different proportions of bovine heparin analysed by C18-MRM, where Bovine indicates that six batches of bovine heparin were mixed in equal proportions, and Porcine indicates that six batches of porcine heparin standards were mixed in equal proportions; 1% bovine represents that 1% bovine heparin is mixed in the porcine heparin standards, and so on; Porcine$_{max}$+3SD represents that the maximum ratio of trisaccharide(4S) to ΔIA in the six bathes of porcine plus 3 times the standard deviation.

FIG. 10 shows the ratios of trisaccharide(4S) to ΔIA of the porcine heparin standards mixed with different proportions of bovine heparin analysed by C18-MRM, where Bovine indicates that six batches of bovine heparin were mixed in equal proportions, and Porcine indicates that six batches of porcine heparin standards were mixed in equal proportions; 1% bovine represents that 1% bovine heparin is mixed in the porcine heparin standards, and so on; Porcine$_{max}$+3SD represents that the maximum ratio of trisaccharide(4S) to ΔIA in the six bathes of porcine plus 3 times the standard deviation. The maximum ratio of trisaccharide(4S) to ΔIA in the six batches of porcine heparin standards+3 SD serves as the determination condition (black horizontal line Porcine$_{max}$+3SD in FIG. 10), when more than 15% ovine heparin is mixed in porcine heparin, the ratios of trisaccharide(4S) to ΔIA obviously exceed the standard, such that the sample may be determined as heparin from ruminants or to contain heparin from ruminants.

What is claimed is:

1. A method for identifying whether porcine heparin is adulterated with heparin from ruminants, comprising the following steps:
   (1) respectively detecting contents of trisaccharide(4S) and ΔUA2S-GlcNAc6S (ΔIA) in a sample and at least three batches of porcine heparin standards;
   (2) calculating a ratio content of the trisaccharide(4S) to the ΔIA as well as a standard deviation (SD) of the ratio in the porcine heparin standards; when the ratio content of the trisaccharide(4S) to the ΔIA in the sample exceeds a maximum value of the ratio in the porcine heparin standards+3SD, the sample is considered to be mixed with heparin from ruminants;
   wherein, the contents of the trisaccharide(4S) and ΔIA in the sample in the step (1) are detected by hydrophilic interaction liquid chromatography-mass spectrometry (HILIC-MS) method, a multiple reaction monitoring (HILIC-MRM) method, or a C18-MRM method;
   wherein: operating conditions of the hydrophilic interaction liquid chromatography-mass spectrometry (HILIC-MS) method are as follows:
   (1) performing exhaustive enzymatic digestion on the sample with a mixed enzyme of heparinase I, heparinase II and heparinase III;
   (2) performing quantitative analysis on the trisaccharide (4S) and ΔIA in the step (1) by the hydrophilic interaction liquid chromatography-mass spectrometry (HILIC-MS) method, wherein an ion detection form of the trisaccharide(4S) is $[M-2H]^{2-}$, and/or $[M-3H+Na]^{2-}$; and an ion detection form of ΔIA is $[M-H]^-$, and/or $[M-3H+Na]^{2-}$;

chromatographic conditions of the hydrophilic interaction liquid chromatography-mass spectrometry (HILIC-MS) method are as follows: analytical column: Phenomenex Luna 3 μm HILIC 200 Å (150×2.0 mm); mobile phase: phase A: 5 mmol/L ammonium acetate aqueous solution; phase B: 5 mmol/L ammonium acetate, and 98% acetonitrile solution; flow rate: 0.15 mL/min; injection volume: 20 pL; step gradient: 0-5 min, 95% B; 5-6 min, 90% B; 6-25 min, 90-84% B; 25-27 min, 84-50% B; 27-31 min, 50-50% B; 31-32 min, 50-95% B; 32-40 min, 95-95% B; parameters of mass spectrometry: instrument: Q Exactive plus; sheath gas: 40 psi; Aux gas: 10 psi; spray voltage: 3.8 kV; capillary temperature: 275° C.; S-lens: 50; m/z: 150-800; and acquisition time: 40 min;

the HILIC-MRM method comprises the following operating steps:

1 performing exhaustive enzymatic digestion on the sample with a mixed enzyme of heparinase I, heparinase II and heparinase III;

2 performing a quantitative analysis on the trisaccharide (4S) and the ΔIA in a product of the step 1, wherein in the quantitative analysis of the HILIC-MRM method for the trisaccharide(4S), a parent ion mass-to-charge ratio is 415.5, z=−2, and a daughter ion mass-to-charge ratio is 157.0; and in the quantitative analysis of the HILIC-MRM method for the ΔIA, a parent ion mass-to-charge ratio is 268.5, z=−2, and a daughter ion mass-to-charge ratio is 300.0;

chromatographic conditions of the HILIC-MRM method are as follows: analytical column: Phenomenex Luna 3 pm HILIC 200 Å (150×2.0 mm); mobile phase: phase A: 5 mmol/L ammonium acetate aqueous solution; phase B: 5 mmol/L ammonium acetate, and 98% acetonitrile solution; flow rate: 0.15 mL/min; injection volume: 10 μL; the step gradient: 0-5 min, 95% B; 5-12 min, 95-50% B; 12-15 min, 50% B; 15-20 min, 95% B;

mass spectrometry conditions of the HILIC-MRM method are as follows: spray voltage: −3.7 kV; spray gas flow rate: 30 arb; acquisition time: 15 min; HILIC-MRM channel parameters are as follows:

for the ΔIA, a structure is ΔUA2S-GlcNAc6S, a theoretical molecular weight is 539.0251, a parent ion is m/z=268.5, z=−2, and a daughter ion is m/z=300; for the trisaccharide(4S), a structure is ΔUA2S-GlcNS6S-HexA2S, a theoretical molecular weight is 832.9602, a parent ion is m/z=415.5, z=−2, and a daughter ion is m/z=157.0;

the C18-MRM method comprises the following operating steps:

1 performing exhaustive enzymatic digestion on the sample with a mixed enzyme of heparinase I, heparinase II and heparinase III;

2 labelling the sample obtained after the step 1 with a 2-aminoacridone solution (AMAC), reducing the labelled sample with sodium cyanoborohydride, centrifuging to take supernatant and preserving the labelled sample at −20° C. for further use;

3 performing a quantitative analysis on the trisaccharide (4S) and the ΔIA in the step 2 with multi-C18-MRM method, wherein in the quantitative analysis derived from the trisaccharide(4S) labelled with the AMAC, a parent ion mass-to-charge ratio is 512.5, z=−2; and a daughter ion mass-to-charge ratio is 432.6; and in the quantitative analysis derived from the ΔIA labelled with the AMAC, a mass-to-charge ratio is chosen to 732.1, z=−2, and a daughter ion mass-to-charge ratio is 652.1;

chromatographic conditions of the C18-MRM method are as follows: analytical column: Kinetex 2.6 pm EVO C18 100A (150×2.1 mm); mobile phase: phase A:50 mmol/L ammonium acetate aqueous solution; mobile phase B: methanol solution; flow rate: 0.3 mL/min; injection volume: 1 μL; column temperature: 45° C.; the step gradient: 0-2 min, 5% B; 2-4 min, 26% B; 4-8 min, 40% B; 8-10 min, 100% B; 10-15 min, 5% B;

mass spectrometry conditions of the C18-MRM method are as follows: spray voltage: −3.7 kV; spray gas flow rate: 30 arb; acquisition time: 15 min; mass spectrometry conditions: spray voltage: −3.7 kV; spray gas flow rate: 30 arb; acquisition time: 15 min; C18-MRM channel parameters are as follows: for the ΔIA labelled with the AMAC, a structure is ΔUA2S-GlcNAc6S-AMAC, a theoretical molecular weight is 733.1095, a parent ion is m/z=732.1022, z=−1, and a daughter ion is m/z=652.1454; for the trisaccharide(4S) labelled with the AMAC, a structure is ΔUA2S-GlcNS6S-HexA2S-AMAC, a theoretical molecular weight is 1027.0446, a parent ion is m/z=512.5150, z=−2, and a daughter ion is m/z=432.5366.

2. The identification method according to claim 1, wherein for the trisaccharide(4S), the ion $[M-2H]^{2-}$ has a mass-to-charge ratio of 415.4729, and the ion $[M-3H+Na]^{2-}$ has a mass-to-charge ratio of 426.4639; for the ΔIA, the ion $[M-H]^-$ has a mass-to-charge ratio of 268.5, and the ion $[M-3H+Na]^{2-}$ has a mass-to-charge ratio of 279.5.

* * * * *